(12) United States Patent
Choi et al.

(10) Patent No.: US 12,710,680 B2
(45) Date of Patent: Aug. 18, 2026

(54) LIGHT PATH CONTROL MEMBER AND DISPLAY DEVICE COMPRISING SAME

(71) Applicant: LG INNOTEK CO., LTD., Seoul (KR)

(72) Inventors: Won Seok Choi, Seoul (KR); Jin Gyeong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 215 days.

(21) Appl. No.: 18/729,751

(22) PCT Filed: Dec. 14, 2022

(86) PCT No.: PCT/KR2022/020340
§ 371 (c)(1),
(2) Date: Jul. 17, 2024

(87) PCT Pub. No.: WO2023/136483
PCT Pub. Date: Jul. 20, 2023

(65) Prior Publication Data

US 2025/0093733 A1 Mar. 20, 2025

(30) Foreign Application Priority Data

Jan. 17, 2022 (KR) ........................ 10-2022-0006866

(51) Int. Cl.
*G02F 1/1679* (2019.01)
*G02F 1/1676* (2019.01)

(52) U.S. Cl.
CPC .......... *G02F 1/1679* (2019.01); *G02F 1/1676* (2019.01)

(58) Field of Classification Search
CPC .... G02F 1/167; G02F 1/1681; G02F 1/16757; G02F 1/1323; G02F 1/133377; G09G 3/344
See application file for complete search history.

(56) References Cited

U.S. PATENT DOCUMENTS

2009/0237775 A1 9/2009 Ito et al.
2016/0011441 A1 1/2016 Schwartz et al.
2023/0236467 A1 7/2023 Park et al.

FOREIGN PATENT DOCUMENTS

JP 2009-229689 A 10/2009
JP 2010-85566 A 4/2010
(Continued)

OTHER PUBLICATIONS

International Search Report dated Mar. 21, 2023 in International Application No. PCT/KR2022/020340.

*Primary Examiner* — Alexander P Gross
(74) *Attorney, Agent, or Firm* — SALIWANCHIK, LLOYD & EISENSCHENK

(57) ABSTRACT

A light path control member according to an embodiment includes a first substrate; a first electrode disposed on the first substrate; a second substrate disposed on the first substrate; a second electrode disposed under the second substrate; a light conversion part disposed between the first electrode and the second electrode and including a plurality of receiving parts for receiving a light conversion material; and a sealing part sealing the light conversion material, wherein the sealing part includes a first sealing part and a second sealing part formed in a cutting region formed by cutting the second substrate, the second electrode, and the light conversion part and extending in a first direction; and a third sealing part and a fourth sealing part formed in a cutting region formed by cutting the second substrate, the second electrode, and the light conversion part and extending in a second direction different from the first direction, and wherein a thickness of at least one sealing part of the third sealing part and the fourth sealing part is different from a thickness of the first sealing part and the second sealing part.

20 Claims, 10 Drawing Sheets

(56) References Cited

FOREIGN PATENT DOCUMENTS

| | | | | |
|---|---|---|---|---|
| JP | 2010085566 | A | * | 4/2010 |
| JP | 2020112741 | A | * | 7/2020 |
| KR | 10-2015-0127211 | A | | 11/2015 |
| KR | 10-2018-0004879 | A | | 1/2018 |
| KR | 10-2018-0113552 | A | | 10/2018 |
| KR | 10-2021-0136603 | A | | 11/2021 |
| KR | 10-2022-0001784 | A | | 1/2022 |

* cited by examiner

LIGHT 110
210
410
300
420
220
120
310
320
330b 330a
330

LIGHT PATH CONTROL MEMBER AND DISPLAY DEVICE COMPRISING SAME

CROSS-REFERENCE TO RELATED APPLICATIONS

This application is the U.S. national stage application of International Patent Application No. PCT/KR2022/020340, filed Dec. 14, 2022, which claims the benefit under 35 U.S.C. § 119 of Korean Application No. 10-2022-0006866, filed Jan. 17, 2022, the disclosures of each of which are incorporated herein by reference in their entirety.

TECHNICAL FIELD

An embodiment relates to a light path control member and a display device including the same.

BACKGROUND ART

A light blocking film is a film that blocks light from being transmitted from a light source. The light blocking film is attached to a front of a display panel, which is a display device used for a mobile phone, laptop, tablet PC, vehicle navigation, or vehicle touch screen. The light blocking film adjusts a viewing angle of light according to an angle of incidence of light when the display outputs a screen. As a result, the user can view clear image quality at the desired viewing angle.

In addition, light blocking film is used for windows in vehicles or buildings. In detail, the light blocking film can inhibit glare by partially shielding external light. Alternatively, the light blocking film can make an inside invisible from an outside.

That is, the light blocking film controls a movement path of light. As a result, the light blocking film can block light at an angle within a set range and transmit light at an angle within a set range. Accordingly, a transmission angle of light is controlled by the light blocking film.

The light blocking film can be divided into a light blocking film that can always control the viewing angle regardless of the surrounding environment, and a switchable light blocking film that allows the user to turn the viewing angle control on and off depending on the surrounding environment.

The switchable light blocking film includes a light conversion part including a receiving part. The receiving part is filled with a light conversion material including particles and a dispersion liquid for dispersing the particles. The particles can move by application of voltage. The receiving part may be converted into a light transmitting part and a light blocking part by dispersion and aggregation of the particles.

An external power source is connected to an electrode of the light path control member to apply a voltage to the light path control member. A region in which the electrode of the light path control member is disposed may be defined as a bezel region in the display device.

Meanwhile, the light path control member may include a cutting region. The cutting region may be formed by cutting one surface of the light path control member. A sealing material may be filled in the cutting region. As a result, a sealing part is formed. The sealing part may seal a light conversion material.

However, the sealing part may be separated while driving the light path control member. Accordingly, external impurities may be introduced through the cutting region. As a result, the reliability of the light path control member may be reduced.

Therefore, an light path control member with a new structure that can solve the above problems is required.

DISCLOSURE

Technical Problem

An embodiment is to provide an light path control member having improved reliability.

Technical Solution

A light path control member according to an embodiment includes a first substrate; a first electrode disposed on the first substrate; a second substrate disposed on the first substrate; a second electrode disposed under the second substrate; a light conversion part disposed between the first electrode and the second electrode and including a plurality of receiving parts for receiving a light conversion material; and a sealing part sealing the light conversion material, wherein the sealing part includes a first sealing part and a second sealing part formed in a cutting region formed by cutting the second substrate, the second electrode, and the light conversion part and extending in a first direction; and a third sealing part and a fourth sealing part formed in a cutting region formed by cutting the second substrate, the second electrode, and the light conversion part and extending in a second direction different from the first direction, and wherein a thickness of at least one sealing part of the third sealing part and the fourth sealing part is different from a thickness of the first sealing part and the second sealing part.

Advantageous Effects

The light path control member according to the embodiment may allow at least one of the first sealing part, the second sealing part, the third sealing part, and the fourth sealing part to be disposed inside the cutting region penetrating the light path control member.

Accordingly, a contact area of the sealing parts may be increased. Thereby, it is possible to inhibit the sealing parts from being separated in the cutting region.

In addition, the thickness of the sealing parts may be increased. Accordingly, it is possible to inhibit moisture from flowing from an outer surface of the light path control member.

In addition, an outer surface of the cutting region may be easily cut without separate cutting equipment. Accordingly, a side bezel region of the light path control member may be reduced.

Accordingly, the light path control member according to the embodiment can inhibit the sealing part from being separated, thereby improving the reliability of the light path control member, inhibiting the penetration of moisture into the inside, improving the driving characteristics of the light path control member, and reducing a size of the side bezel.

DESCRIPTION OF DRAWINGS

FIG. 3 is a view diagram illustrating a second substrate of the light path control member according to an embodiment.

BEST MODE

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and redisposed.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

In addition, when described as being formed or disposed "on (over)" or "under (below)" of each element, the "on (over)" or "under (below)" may include not only when two elements are directly connected to each other, but also when one or more other elements are formed or disposed between two elements.

Further, when expressed as "on (over)" or "under (below) ", it may include not only the upper direction but also the lower direction based on one element.

Hereinafter, a light path control member according to an embodiment will be described with reference to the drawings. The light path control member described hereinafter may be a switchable light blocking film that is driven in a share mode or a light blocking mode according to an application of power.

Figures 1, 2:
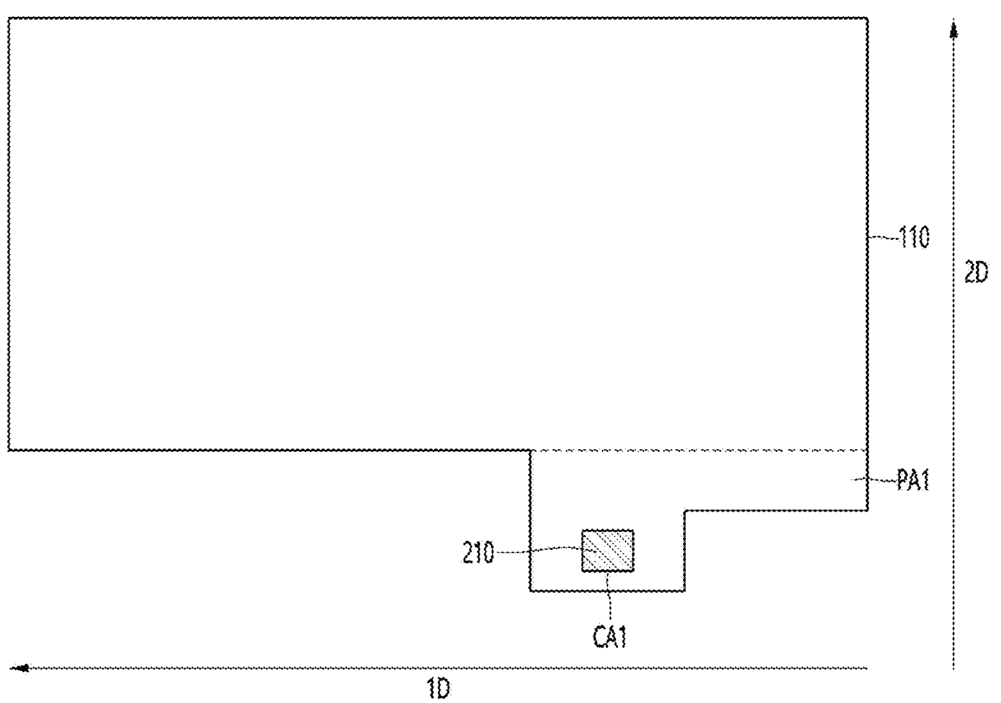
FIG. 1 is a perspective view of a light path control member according to an embodiment.
FIG. 2 is a view illustrating a top view of a first substrate of the light path control member according to an embodiment.

FIG. 1 is a perspective view of a light path control member according to an embodiment.

Referring to FIG. 1, the light path control member 1000 according to an embodiment includes a first substrate 110, a second substrate 120, a first electrode 210, a second electrode 220, and a light conversion part 300.

The first substrate 110 supports a first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may include any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC), polyvinyl alcohol (PVA) film, polyimide (PI), or polystyrene (PS). However, this is only an example of the embodiment, and the embodiment is not limited thereto.

In addition, the first substrate 110 may be a flexible substrate with flexible characteristics.

Also, the first substrate 110 may be curved or bent. Therefore, the light path control member may also have flexible, curved, or bent characteristics. Accordingly, the light path control member may be formed in various designs.

The first substrate 110 may extend in a first direction 1D, a second direction 2D, and a third direction 3D.

Specifically, the first direction 1D and the second direction 2D may correspond to a longitudinal direction or a width direction of the light path control member. In addition, the first direction 1D and the second direction 2D may be different directions. Also, the third direction 3D may correspond to a thickness direction of the light path control member.

Hereinafter, for convenience of explanation, the first direction 1D is defined in the longitudinal direction of the light path control member. Furthermore, the second direction 2D is defined in the width direction of the light path control member. Furthermore, the third direction 3D is defined in the thickness direction of the light path control member.

The first substrate 110 has a thickness within a set range. For example, the first substrate 110 may have a thickness of 25 μm to 150 μm.

The first electrode 210 is disposed on one surface of the first substrate 110. In detail, the first electrode 210 is disposed on an upper surface of the first substrate 110. The first electrode 210 is disposed between the first substrate 110 and the second substrate 120.

The first electrode 210 may include a transparent conductive material. For example, the first electrode 210 may include a conductive material having a light transmittance of about 80% or more. For example, the first electrode 210 may include indium tin oxide, indium zinc oxide, copper oxide, tin oxide, zinc oxide, or titanium oxide.

The first electrode 210 may have a thickness of about 10 nm to about 300 nm.

Alternatively, the first electrode 210 may include a metal. Accordingly, the first electrode 210 may have a low resistance. For example, the first electrode 210 may include at least one metal among chromium (Cr), nickel (Ni), copper (Cu), aluminum (Al), silver (Ag), molybdenum (Mo), Gold (Au), titanium (Ti), and alloys thereof.

The first electrode 210 may be entirely disposed on one surface of the first substrate 110. Specifically, the first electrode 210 may include a surface electrode. However, the embodiment is not limited thereto, and the first electrode 210 may be formed of a plurality of pattern electrodes having a certain pattern such as a mesh or stripe shape.

For example, the first electrode 210 may include a plurality of conductive patterns. In detail, the first electrode 210 may include a plurality of mesh lines crossing each other and a plurality of mesh openings formed by the mesh lines.

Accordingly, even if the first electrode 210 includes metal, it is possible to inhibit the first electrode 210 from being visible from an outside. Accordingly, the visibility of the light path control member may be improved. Furthermore, since the light transmittance is increased by the openings, the luminance of the light path control member can be improved.

The second substrate 120 is disposed on the first substrate 110. In detail, the second substrate 120 is disposed on the first electrode 210.

The second substrate 120 may include the same or similar material as that of the first substrate 110. For example, the second substrate 120 may include the same material as the first substrate 110 or a different material among the materials of the first substrate 110 described above.

Also, a thickness of the second substrate 120 may be the same as or similar to the thickness of the first substrate 110. For example, the thickness of the second substrate 120 may be 25 μm to 150 μm.

In addition, the second substrate 120 may also extend in the first direction 1D, the second direction 2D, and the third direction 3D to correspond to the first substrate 110.

The second electrode 220 is disposed on one surface of the second substrate 120.

Specifically, the second electrode 220 is disposed on a lower surface of the second substrate 120. That is, the second electrode 220 is disposed on one surface of the second substrate 120 where the second substrate 120 and the first substrate 110 face each other. That is, the second electrode 220 is disposed to face the first electrode 210. That is, the second electrode 220 is disposed between the first electrode 210 and the second substrate 120.

The second electrode 220 may include the same or similar material as or to the first electrode 210. For example, the second electrode 220 may include the same material as the first electrode 210 or a different material among the materials of the first electrode 210 described above.

Also, a thickness of the second electrode 220 may be the same as or similar to that of the first electrode 210. For example, a thickness of the second electrode 220 may be about 10 nm to about 300 nm.

Also, a thickness of the second electrode 220 may be the same as or similar to that of the first electrode 210. Also, a shape of the second electrode 220 may be the same as or similar to that of the first electrode 210. For example, the second electrode 220 may include a surface electrode or a plurality of pattern electrodes.

The first substrate 110 and the second substrate 120 may have the same size or different sizes.

Specifically, a first length of the first substrate 110 in the first direction 1D may be the same as or similar to a second length of the second substrate 120 in the first direction 1D.

For example, the first length and the second length may be 300 mm to 400 mm.

In addition, a first width of the first substrate 110 in the second direction (2D) may be the same as or similar to a second width of the second substrate 120 in the second direction.

For example, the first width and the second width may be 150 mm to 200 mm.

In addition, the first substrate 110 and the second substrate 120 may be formed in different areas.

Figure 3:
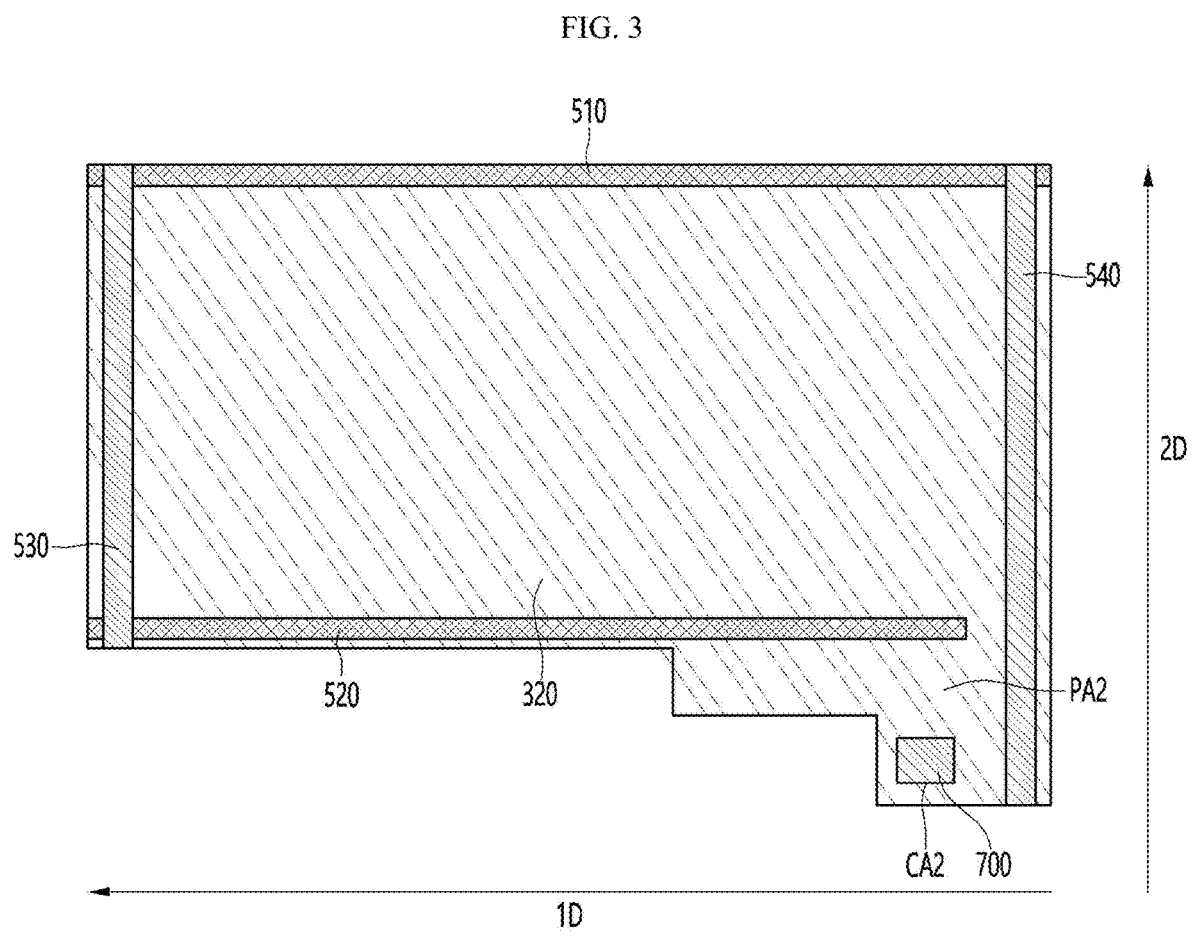

Specifically, the first substrate 110 and the second substrate 120 include protrusions. Referring to FIGS. 2 and 3, the first substrate 110 includes a first protrusion PA1. Also, the second substrate 120 includes a second protrusion PA2. The first protrusion PA1 and the second protrusion PA2 are disposed to be misaligned.

That is, the first protrusion PA1 and the second protrusion PA2 do not overlap each other in the third direction 3D.

The embodiments are not limited thereto. The first protrusion PA1 and the second protrusion PA2 may include an overlapping region and a non-overlapping region. That is, the first protrusion PA1 and the second protrusion PA2 may include an overlapping region overlapping each other in the third direction and a non-overlapping region that does not overlapping each other in the third direction.

In this case, the first protrusion PA1 and the second protrusion PA2 may have different areas. Accordingly, the first substrate 110 and the second substrate 120 may have different sizes by the difference in area of the protrusions.

A connection region connected to an external (flexible) printed circuit board may be disposed on each of the first protrusion PA1 and the second protrusion PA2.

Specifically, a first connection region CA1 is disposed on the first protrusion PA1. Also, a second connection region CA2 is disposed on the second protrusion PA2. When the first protrusion PA1 and the second protrusion PA2 are disposed at positions that are misaligned with each other, the first connection region CA1 and the second connection region CA2 do not overlap in the third direction 3D.

Conductive materials may be exposed on upper surfaces of the first connection region CA1 and the second connection region CA2, respectively. For example, a first electrode 210 may be exposed on the first connection region CA1. Also, a conductive material 700 may be exposed on the second connection region CA2. A cutting region for filling a conductive material may be formed on the second protrusion PA2 of the second substrate 120. The conductive material may be filled in a cutting region. Accordingly, the second connection region CA2 may be formed.

The light path control member and an external (flexible) printed circuit board may be electrically connected by the first connection region CA1 and the second connection region CA2.

For example, a pad part may be disposed on the first connection region CA1 and the second connection region CA2. A conductive adhesive including an anisotropic conductive film (ACF) or anisotropic conductive paste (ACP) may be disposed between the pad part and the (flexible) printed circuit board. Accordingly, the light path control member may be electrically connected to an external (flexible) printed circuit board.

Alternatively, a conductive adhesive including an anisotropic conductive film (ACF) or anisotropic conductive paste (ACP) is disposed between the first connection region CA1 and the second connection region CA2 and the (flexible) printed circuit board. That is, the pad part may be omitted. Accordingly, the light path control member may be directly connected to an external (flexible) printed circuit board.

The light conversion part 300 is disposed between the first substrate 110 and the second substrate 120. Specifically, the light conversion part 300 is disposed between the first electrode 210 and the second electrode 220.

An adhesive layer or a buffer layer may be disposed in a region between the light conversion part 300 and the first substrate 110 or a region between the light conversion part 300 and the second substrate 120, respectively. The first substrate 110, the second substrate 120, and the light conversion part 300 may be adhered by the adhesive layer and the buffer layer.

For example, an adhesive layer 410 is disposed between the first electrode 210 and the light conversion part 300. Accordingly, the first substrate 110 and the light conversion part 300 may be adhered.

The adhesive layer 410 may have a thickness within a predetermined range. For example, the adhesive layer 410 may have a thickness of 10 μm to 30 μm.

Also, a buffer layer 420 may be disposed between the second electrode 220 and the light conversion part 300. Accordingly, the adhesion between the second electrode 220 including the different materials and the light conversion part 300 may be improved.

The buffer layer 420 may have a thickness within a set range. For example, the thickness of the buffer layer 420 may be less than 1 μm.

The light conversion part 300 may include a plurality of partition wall parts 310 and a plurality of receiving parts 320. A light conversion material 3300 is disposed inside the receiving part 320. The light transmittance of the light path control member may be changed by the light conversion particles. Light transmission characteristics of the light path control member may be changed by the light conversion material.

Figures 4, 5:
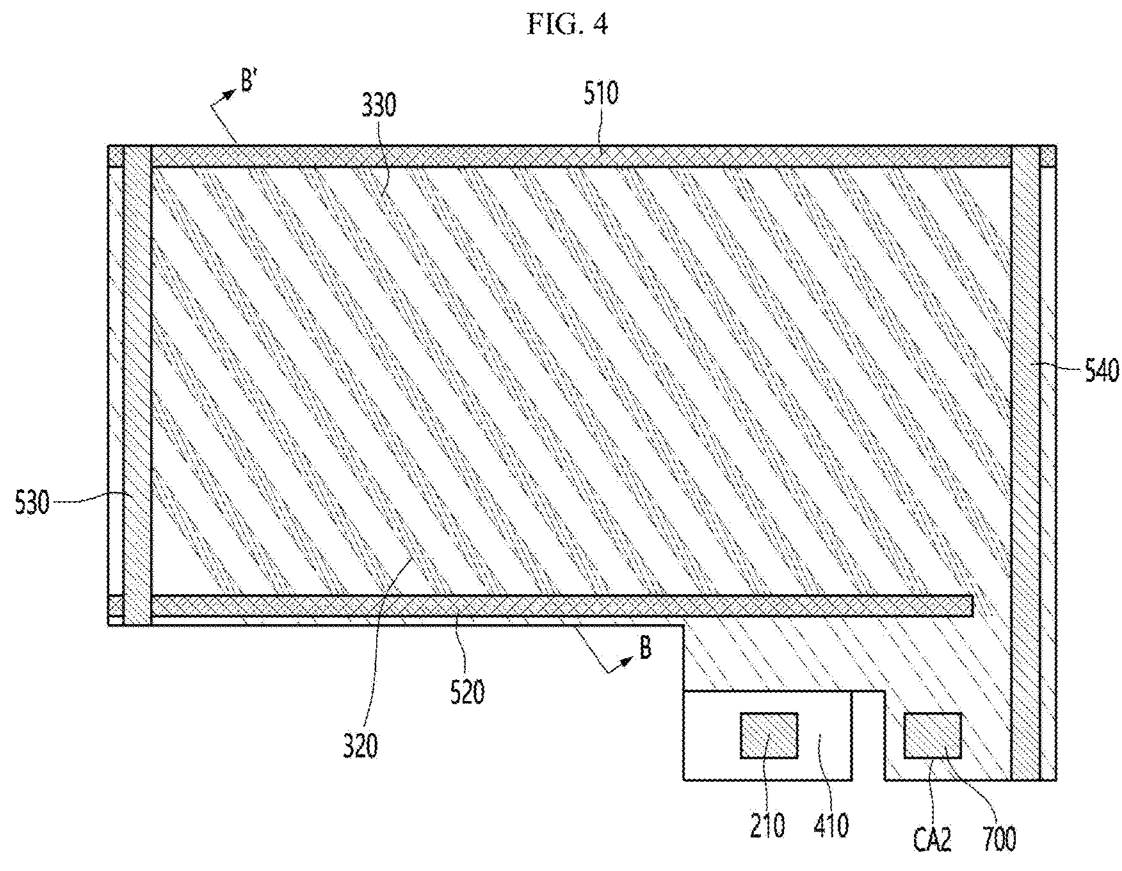
FIG. 4 is a view illustrating a top view of a second substrate in a state in which a first substrate and a second substrate of an light path control member according to an embodiment are laminated.
FIGS. 5 and 6 are cross-sectional views taken along line A-A' region of FIG. 1.

Referring to FIGS. 3 and 4, the receiving part 320 may extend in one direction. Specifically, the receiving part 320 may be tilted at a certain angle.

For example, the receiving part 320 may extend in a direction different from the first and second directions 1D and 2D. That is, the receiving part 320 may be tilted with respect to the first direction 1D and the second direction 2D. For example, the receiving part 320 may extend in a direction between the first and second directions 1D and 2D.

The receiving parts 320 may be sealed by the same or different sealing parts depending on a direction in which the receiving parts 320 extend.

For example, both of the receiving parts 320 may be sealed by the first sealing part 510 and the second sealing part 520.

Alternatively, at least one receiving part among the receiving parts 320 may be sealed by the first sealing part 510 and the fourth sealing part 540. Also, at least one other receiving part may be sealed by the first sealing part 510 and the second sealing part 520. Also, at least another receiving part may be sealed by the second sealing part 520 and the third sealing part 530.

The receiving part 320 is tilted at an inclination angle within a range set with respect to the first direction 1D and the second direction 2D. Accordingly, when the light path control member and the display panel are combined to form a display device, a moiré phenomenon caused by overlapping the receiving part and a pattern part of the display panel may be inhibited.

However, the embodiment is not limited thereto. That is, the receiving part 320 is not tilted. That is, the receiving part 320 may be disposed to extend in the first direction 1D or the second direction 2D.

The first sealing part 510, the second sealing part 520, the third sealing part 530, and the fourth sealing part 540 may have the same thickness or different thicknesses. Thicknesses of the first sealing part 510, the second sealing part 520, the third sealing part 530, and the fourth sealing part 540 will be described in detail below.

Figure 6:
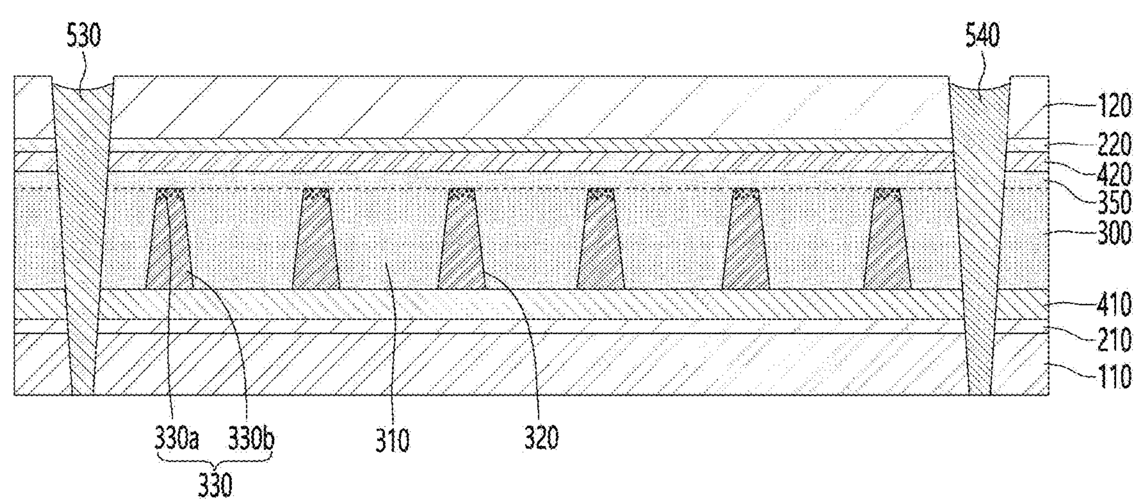

FIGS. 5 and 6 are cross-sectional views taken along line A-A' region of FIG. 1.

Referring to FIGS. 5 and 6, the light conversion part 300 may include a partition wall part 310 and an receiving part 320.

The partition wall part 310 may partition an receiving part. That is, the partition wall part 310 may transmit light. That is, light emitted from the first substrate 110 or the second substrate 120 may pass through the partition wall part 310.

The partition wall part 310 and the receiving part 320 may have different widths. For example, a width of the partition wall part 310 may be greater than a width of the receiving part 320.

In addition, the receiving part 320 may be formed in a shape whose width narrows while extending in a direction from the first electrode 210 toward the second electrode 220.

The partition wall part 310 and the receiving part 320 may be alternately disposed. That is, each of the partition wall parts 310 may be disposed between receiving parts 320 adjacent to each other. Also, each receiving part 320 may be disposed between partition wall parts 310 adjacent to each other.

The partition wall part 310 may include a transparent material. The partition wall part 310 may include a material capable of transmitting light.

The partition wall part 310 may include a resin material. For example, the partition wall part 310 may include a photocurable resin material. For example, the partition wall part 310 may include a UV resin or a transparent photoresist resin. Alternatively, the partition wall part 310 may include a urethane resin or an acrylic resin.

The receiving part 320 may be formed by partially passing through the light conversion part 300. Accordingly, the receiving part 320 may be in contact with the adhesive layer 410. Also, the receiving part 320 may be spaced apart from the buffer layer 420. Accordingly, a base part 350 may be formed between the receiving part 320 and the buffer layer 420.

A light conversion material 330 may be disposed inside the receiving part 320. The light conversion material 330 may include light conversion particles **330*a* and a dispersion liquid 330*b* for dispersing the light conversion particle 330*a***.

The dispersion liquid **330*b* may include a transparent material. The dispersion liquid 330*b* may include a non-polar solvent. Also, the dispersion liquid 330*b* may include a material capable of transmitting light. For example, the dispersion liquid 330*b*** may include at least one material among halocarbon-based oil, paraffin-based oil, and isopropyl alcohol.

The light conversion particles **330*a* may be dispersed in the dispersion liquid 330*b***.

The light conversion particle 330*a* may include a material capable of absorbing light. That is, the light conversion particle 330*a* may be a light absorbing particle, and the light conversion particle 330*a* may have a color. For example, the light conversion particle 330*a* may have a black-based color. For example, the light conversion particle 330*a* may include carbon black particles.

A surface of the light conversion particle 330*a* may be charged and thus have a polarity. For example, a surface of the light conversion particle 330*a* may be charged with a negative (−) charge. Accordingly, when a voltage is applied, the light conversion particle 330*a* may be moved toward the first electrode 210 or the second electrode 220.

A light transmittance of the receiving part 320 may be changed by the light conversion particles 330*a*. Specifically, the receiving part 320 may be changed into a light blocking part and a light transmitting part by the light conversion particles 330*a*. That is, the receiving part 330*a* may change the transmittance of light passing through the receiving part 320 by dispersion and aggregation of the light conversion particles 330*a*.

For example, the light path member according to an embodiment may be switched from a first mode to a second mode by a voltage applied to the first electrode 210 and the second electrode 220. Alternatively, the light path member according to an embodiment may be switched from the second mode to the first mode by a voltage applied to the first electrode 210 and the second electrode 220.

In the first mode, the receiving part 320 may be a light blocking part. Accordingly, light of a set range angle may be blocked. Accordingly, a viewing angle of the user may be narrowed. Accordingly, the light path control member may be driven in a privacy mode.

Also, in the second mode, the receiving part 320 may be a light transmitting part. Accordingly, light may be transmitted from both the partition wall part 310 and the receiving part 320. Accordingly, a viewing angle of the user may be widened. Accordingly, the light path control member may be driven in a share mode.

The switching from the first mode to the second mode may be implemented by the movement of the light conversion particle 330*a*. The light conversion particle 330*a* has electric charges on the surface thereof. The light conversion particle 330*a* may be moved toward a first electrode or a second electrode by the characteristics of the surface charge when a voltage is applied.

For example, when a voltage is not applied to the light path control member, the light conversion particles 330*a* are uniformly dispersed in the dispersion liquid 330*b*. Accordingly, light of the receiving part 320 may be blocked by the light conversion particles 330*a*. Accordingly, in the first mode, the receiving part 320 may be driven as the light blocking part.

In addition, when a voltage is applied to the light path control member, the light conversion particles 330*a* may be moved. For example, the light conversion particles 330*a* may be moved in a direction toward one end or the other end of the receiving part 320 by the voltage. That is, the light conversion particles 330*a* may be moved in a direction toward the first electrode 210 or the second electrode 220.

For example, when a voltage is applied to the first electrode 210 and/or the second electrode 220, an electric field is formed between the first electrode 210 and the second electrode 220. Accordingly, the light conversion particles 330*a* of which the surface is negatively charged may be moved in a direction toward an electrode having a positive electrode among the first electrode 210 and the second electrode 220 using the dispersion 330*b* as a medium.

Referring to FIG. 5, when a voltage is not applied to the first electrode 210 and/or the second electrode 220, the light conversion particles 330*a* may be uniformly dispersed in the dispersion liquid 330*b*. Accordingly, the receiving part 320 may be driven as the light blocking part.

Referring to FIG. 6, when a voltage is applied to the first electrode 210 and/or the second electrode 220, the light conversion particle 330*a* may move in a direction toward the second electrode 220. That is, the light conversion particle 330*a* moves in the one direction. Accordingly, the receiving part 320 may be driven as the light transmitting part.

Accordingly, the light path control member according to an embodiment may be driven in two modes according to the user's surrounding environment or the like. That is, when the user wants to transmit light only at a specific viewing angle, the receiving part may be driven as the light blocking part, or when the user is in an environment that requires a wide viewing angle and high luminance, the receiving part may be driven as the light transmitting part by applying a voltage.

Therefore, since the light path control member according to the embodiment may be implemented in two modes according to the user's request, the light path member may be applied regardless of the user's environment.

Referring to FIGS. 1, 5, 6, and 7, the light path control member may include a sealing part. The sealing part may seal the light conversion material.

The sealing part may include a sealing part extending in the first direction 1D and a sealing part extending in the second direction 2D. For example, the sealing part may include a first sealing part 510 and a second sealing part 520 extending in the first direction 1D. The first sealing part 510 and the second sealing part 520 may be disposed to face each other in the second direction 2D.

Also, the sealing part may include a third sealing part 530 and a fourth sealing part 540 extending in the second direction 2D. The third sealing part 530 and the fourth sealing part 540 may be disposed to face each other in the first direction 1D.

The first sealing part 510, the second sealing part 520, the third sealing part 530, and the fourth sealing part 540 may be disposed at an edge region of the light path control member.

Also, the first sealing part 510, the second sealing part 520, the third sealing part 530, and the fourth sealing part 540 may be connected to each other. In detail, the first sealing part 510, the second sealing part 520, the third sealing part 530, and the fourth sealing part 540 may be connected to each other except for an open region OA. The open region OA is a region that conducts electricity between the second connection region CA2 and the second electrode 220.

The first sealing part 510, the second sealing part 520, the third sealing part 530, and the fourth sealing part 540 may be formed by a cutting region of the light path control member 1000.

For example, the light path control member 1000 may include a cutting region. The cutting region may be formed by removing at least one of the second substrate 120, the second electrode 220, the buffer layer 420, the light conversion part 300, the adhesive layer 410, the first electrode 210, and the first substrate 110. The first sealing part 510, the second sealing part 520, the third sealing part 530, and the fourth sealing part 540 may be disposed in the cutting region.

Specifically, the light conversion material 330 may be injected into the receiving part 320 through the cutting region. Subsequently, a sealing material may be disposed in the cutting region. Accordingly, the light conversion material 300 may be sealed. For example, a cutting region in which the first sealing part 510 is disposed may be an injection part for injecting a light conversion material. Also, a cutting region in which the second sealing part 520 is disposed may be a suction part for sucking the light conversion material.

The first sealing part 510, the second sealing part 520, the third sealing part 530, and the fourth sealing part 540 may be in contact with both ends of the receiving part 320. That is, the first sealing part 510, the second sealing part 520, the third sealing part 530, and the fourth sealing part 540 may be disposed in contact with both ends of the receiving part 320 depending on the direction in which the receiving part extends.

In this case, the number of receiving parts in contact with the first sealing part 510 and the second sealing part 520 may be greater than the number of receiving parts in contact with the third sealing part 530 and the fourth sealing part 540. The first sealing part 510 and the second sealing part 520 are paths through which the light conversion material is injected. Accordingly, the first sealing part 510 and the second sealing part 520 may be in contact with all of the receiving parts. On the other hand, the third sealing part 530 and the fourth sealing part 540 may be in contact with some of the receiving parts.

Accordingly, the first sealing part 510, the second sealing part 520, the third sealing part 530, and the fourth sealing part 540 may inhibit the light conversion material 330 from flowing out of the receiving part 320.

Alternatively, only the first sealing part 510 and the second sealing part 520 may be disposed in contact with both ends of the receiving part 320 depending on the direction in which the receiving part extends.

Accordingly, the first sealing part 510 and the second sealing part 520 may inhibit the light conversion material 330 from flowing out of the receiving part 320. Also, the third sealing part 530 and the fourth sealing part 540 may inhibit moisture from flowing into a side surface of the light path control member.

The first sealing part 510, the second sealing part 520, the third sealing part 530, and the fourth sealing part 540 may have different thicknesses. In detail, thicknesses of at least one sealing part of the first sealing part 510 and the second sealing part 520 may be different from thicknesses of the third sealing part 530 and the fourth sealing part 540. For example, thicknesses of the first sealing part 510 and the second sealing part 520 may be different from thicknesses of the third sealing part 530 and the fourth sealing part 540.

Figure 7:
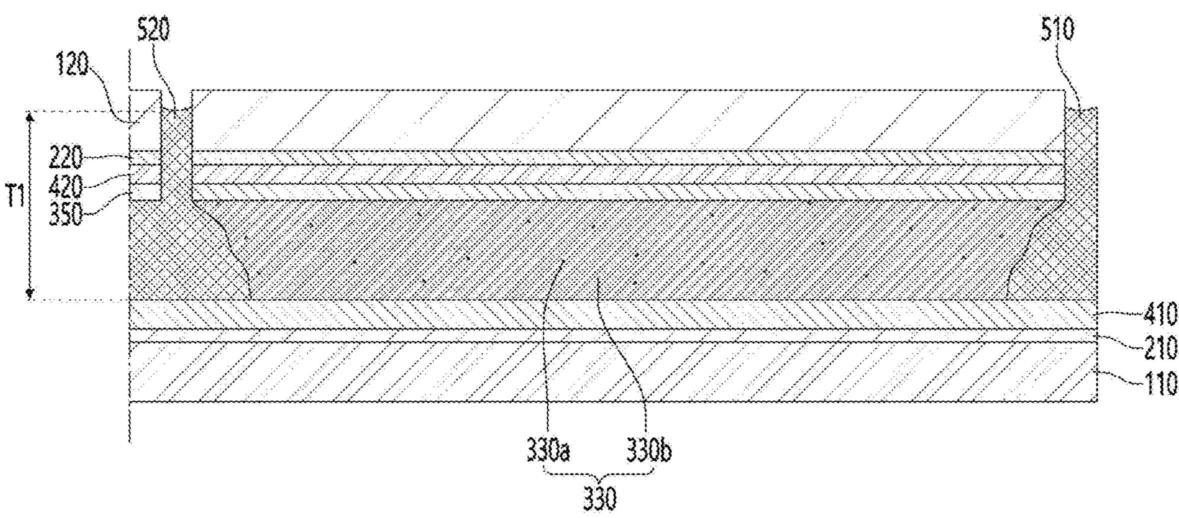
FIG. 7 is a cross-sectional view taken along line B-B' region of FIGS. 1 and 4.

Referring to FIG. 7, the first sealing part 510 and the second sealing part 520 may be disposed inside the cutting region. The cutting region may be formed to partially or entirely penetrate the second substrate 120, the second electrode 220, the buffer layer 420, and the light conversion part 300.

Accordingly, the first sealing part 510 and the second sealing part 520 may be disposed in contact with the side surfaces of the second substrate 120, the second electrode 220, the buffer layer 420, and the light conversion part 300.

Also, referring to FIGS. 5 and 6, the third sealing part 530 and the fourth sealing part 540 may be disposed in the cutting region. The cutting region may be formed to penetrate the second substrate 120, the second electrode 220, the buffer layer 420, the light conversion part 300, the adhesive layer 410, the first electrode 210, and the first substrate 110.

Accordingly, the third sealing part 530 and the fourth sealing part 540 may be disposed in contact with the side surfaces of the second substrate 120, the second electrode 220, the buffer layer 420, the light conversion part 300, the adhesive layer 410, the first electrode 210, and the first substrate 110.

That is, the third sealing part 530 and the fourth sealing part 540 may be disposed in a cutting region penetrating upper and lower surfaces of the light path control member.

Accordingly, thicknesses T2 of the third sealing part 530 and the fourth sealing part 540 may be greater than thicknesses T1 of the first sealing part 510 and the second sealing part 520. Here, the thicknesses T1 and T2 may be defined as thicknesses in the third direction 3D.

Accordingly, an adhesive force of the third sealing part 530 and the fourth sealing part 540 may be improved. An adhesive force between the sealing material forming the third sealing part 530 and the fourth sealing part 540 and the material forming the electrode and the substrate may be greater than an adhesive force between the material forming the light conversion part and the material forming the electrode and the substrate. The third sealing part 530 and the fourth sealing part 540 may also be in contact with the first substrate 110 and the first electrode 210. Accordingly, the adhesive force of the third sealing part 530 and the fourth sealing part 540 disposed in the cutting region may be improved.

Accordingly, the embodiment can inhibit the third sealing part 530 and the fourth sealing part 540 from being separated from each other. Thereby, the reliability of the light path control member can be improved.

Additionally, when the third sealing part 530 and the fourth sealing part 540 are filled in the cutting region, air bubbles caused by the sealing material may be released to the outside. That is, the cutting region penetrates the light path control member, and accordingly, bubbles generated during the filling process with the sealing material may be released to the outside.

Accordingly, the embodiment reduces the occurrence of voids caused by the air bubbles after the third sealing part 530 and the fourth sealing part 540 are cured. Accordingly, the sealing characteristics of the third sealing part 530 and the fourth sealing part 540 can be improved.

Also, the third sealing part 530 and the fourth sealing part 540 may entirely seal the side surface of the light path control member. Accordingly, the embodiment can easily inhibit moisture from penetrating through the first substrate, the first electrode, and the adhesive layer.

The third sealing part 530 and the fourth sealing part 540 may have different widths of lower and upper surfaces. Here, the lower surfaces of the third sealing part 530 and the fourth sealing part 540 are defined as the width of the cutting region exposed in the first substrate 110. Also, the upper surface is defined as the width of the cutting region exposed in the second substrate 120.

The width of the third sealing part 530 and the fourth sealing part 540 may be decreased while extending from the second substrate 120 toward the first substrate 110. That is, the width of the third sealing part 530 and the fourth sealing part 540 may be decreased while extending from the upper surface toward the lower surface. Accordingly, the third sealing part 530 and the fourth sealing part 540 may have a maximum width on the upper surface and a minimum width on the lower surface.

Accordingly, a width w1 of the lower surface may be less than the a of the upper surface w2. Specifically, the width w1 of the lower surface may have a size of 10% or less, 5% or less, 3% or less, or 1% or less with respect to the width w2 of the upper surface.

When the width w1 of the lower surface is greater than 10% with respect to the width of the upper surface w2, an uncured sealing material may flow to the lower surface. Accordingly, a sealing material may remain on the first substrate 110. Therefore, it may be visually recognized as a stain by the user.

Figure 8:
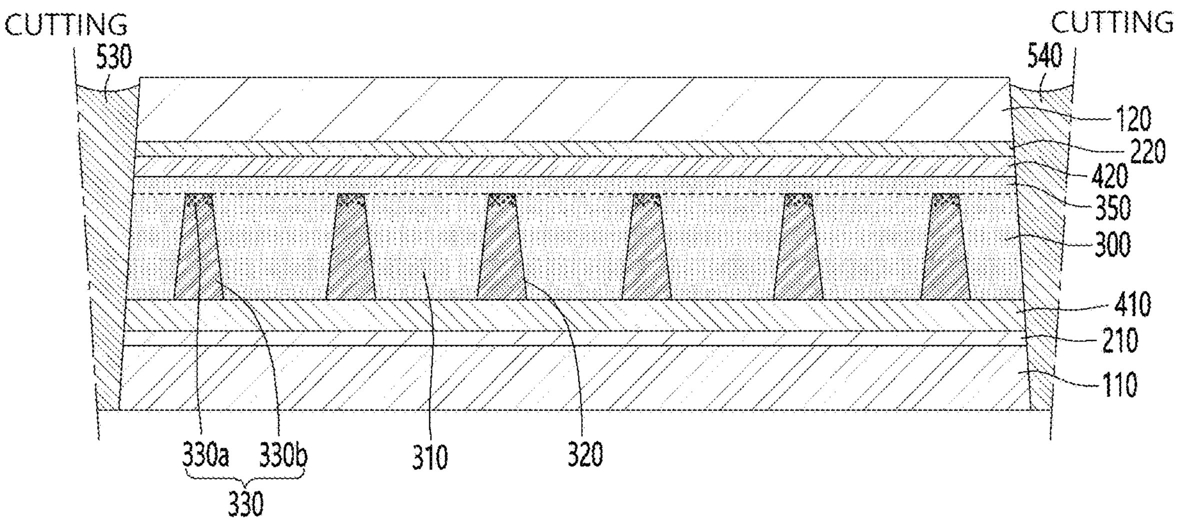
FIG. 8 is a cross-sectional view taken along line A-A' region of FIGS. 1 and 4.

Referring to FIG. 8, the third sealing part 530 and the fourth sealing part 540 may be exposed to an outermost surfaces of the light path control member.

The cutting region in which the third sealing part 530 and the fourth sealing part 540 are disposed is formed through the light path control member. Accordingly, the first substrate 110, the second substrate 120, the first electrode 210, the second electrode 220, the adhesive layer 410, and the buffer layer 420 disposed on the outer surfaces of the third sealing part 530 and the fourth sealing part 540 may be manually cut without using separate cutting equipment.

Accordingly, the third sealing part 530 and the fourth sealing part 540 may be directly exposed to the outermost surface of the light path control member.

Accordingly, a size of a left and right bezel region of the light path control member is reduced. Accordingly, a size of the light path control member may be reduced.

Meanwhile, the first sealing part 510 and the second sealing part 520 may also be disposed in a cutting region penetrating the light path control member.

Figure 9:
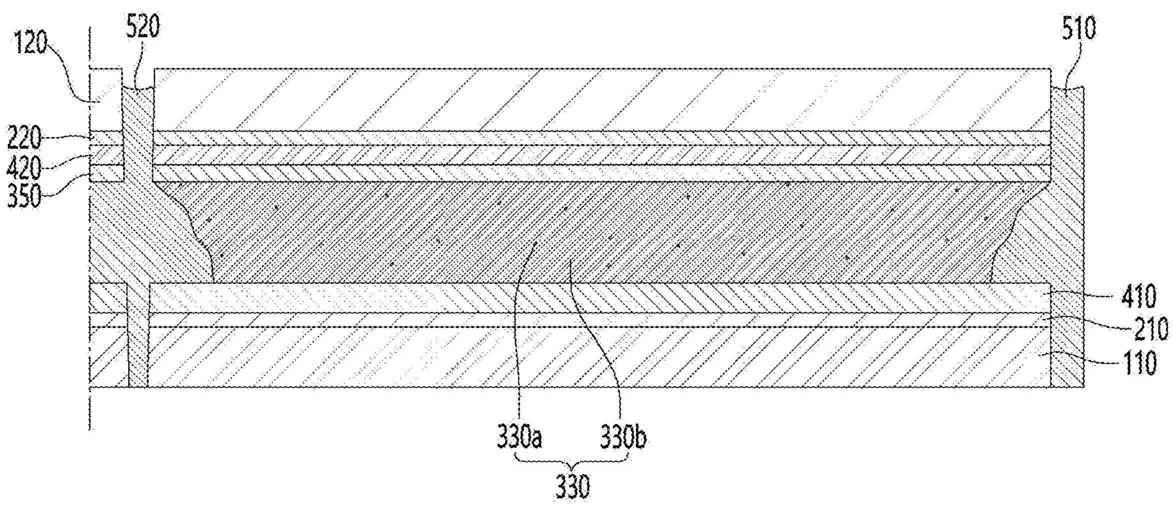
FIG. 9 is a cross-sectional view taken along line B-B' region of FIG. 1 according to another embodiment

Referring to FIG. 9, the first sealing part 510 and the second sealing part 520 may be disposed inside the cutting region. The cutting region may be formed to pass through the second substrate 120, the second electrode 220, the buffer layer 420, the light conversion part 300, the adhesive layer 410, the first electrode 210, and the first substrate 110.

Accordingly, the first sealing part 510 and the second sealing part 520 may be disposed in contact with the side surfaces of the second substrate 120, the second electrode 220, the buffer layer 420, the light conversion part 300, the adhesive layer 410, the first electrode 210, and the first substrate 110.

That is, the first sealing part 510 and the second sealing part 520 may also be disposed in a cutting region passing through the upper and lower surfaces of the light path control member.

Accordingly, all of the first sealing part 510, the second sealing part 520, the third sealing part 530, and the fourth sealing part 540 may entirely seal the side surface of the light path control member. Therefore, it is possible to inhibit external moisture from penetrating through the outer surface of the light path control member.

The light path control member according to the embodiment may allow at least one of the first sealing part, the second sealing part, the third sealing part, and the fourth sealing part to be disposed inside the cutting region penetrating the light path control member.

Accordingly, a contact area of the sealing parts may be increased. Thereby, it is possible to inhibit the sealing parts from being separated in the cutting region.

In addition, the thickness of the sealing parts may be increased. Accordingly, it is possible to inhibit moisture from flowing from an outer surface of the light path control member.

In addition, an outer surface of the cutting region may be easily cut without separate cutting equipment. Accordingly, a side bezel region of the light path control member may be reduced.

Accordingly, the light path control member according to the embodiment can prevent inhibit the sealing part from being separated, thereby improving the reliability of the light path control member, inhibiting the penetration of moisture into the inside, improving the driving characteristics of the light path control member, and reducing a size of the side bezel.

Hereinafter, a display device and a display device to which a light path control member according to an embodiment is applied will be described with reference to FIGS. 10 to 14.

Figure 10:
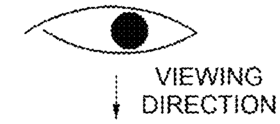
FIGS. 10 and 11 are cross-sectional views of a display device to which an light path control member according to an embodiment is applied.
Figure 10:
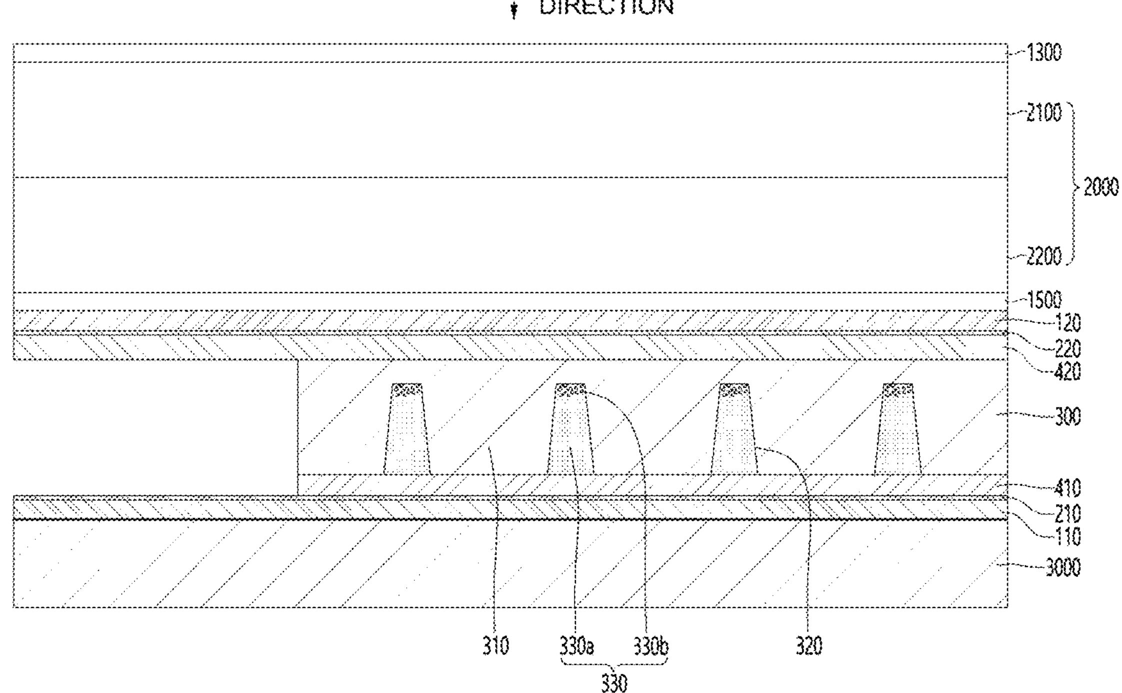
Figure 11:
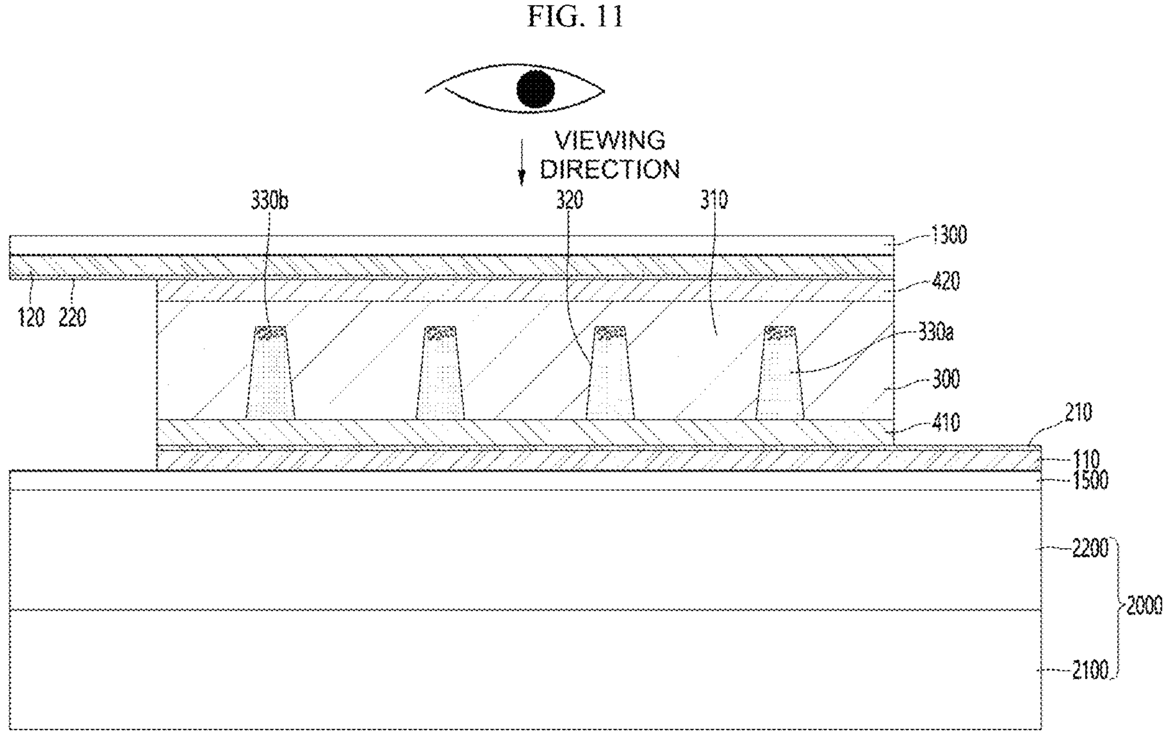

Referring to FIGS. 10 and 11, the light path control member 1000 according to the embodiment may be disposed on or below the display panel 2000.

The display panel 2000 and the light path control member 1000 may be disposed to be adhered to each other. For example, the display panel 2000 and the light path control member 1000 may be adhered to each other via an adhesive member 1500. The adhesive member 1500 may be transparent. For example, the adhesive member 1500 may include an adhesive or an adhesive layer including a light transparent adhesive material.

The adhesive member 1500 may include a release film. In detail, when adhering the light path control member and the display panel, the light path control member and the display panel may be adhered after the release film is removed.

The display panel 2000 may include a first base substrate 2100 and a second base substrate 2200. When the display panel 2000 is a liquid crystal display panel, the light path control member may be formed under the liquid crystal panel. That is, when a surface viewed by the user in the liquid crystal panel is defined as an upper portion of the liquid crystal panel, the light path control member may be disposed under the liquid crystal panel. The display panel 2000 may be formed in a structure in which the first base substrate 2100 including a thin film transistor (TFT) and a pixel electrode and the second base substrate 2200 including color filter layers are bonded to each other with a liquid crystal layer interposed therebetween.

In addition, the display panel 2000 may be a liquid crystal display panel of a color filter on transistor (COT) structure in which a thin film transistor, a color filter, and a black electrolyte are formed at the first base substrate 2100 and the second base substrate 2200 is bonded to the first base substrate 2100 with the liquid crystal layer interposed therebetween. That is, a thin film transistor may be formed on the first base substrate 2100, a protective film may be formed on the thin film transistor, and a color filter layer may be formed on the protective film. In addition, a pixel electrode in contact with the thin film transistor may be formed on the first base substrate 2100. At this point, in order to improve an aperture ratio and simplify a masking process, the black electrolyte may be omitted, and a common electrode may be formed to function as the black electrolyte.

In addition, when the display panel 2000 is the liquid crystal display panel, the display device may further include a backlight unit 3000 providing light from a rear surface of the display panel 2000.

That is, as shown in FIG. 10, the light path control member may be disposed under the liquid crystal panel and on the backlight unit 3000, and the light path control member may be disposed between the backlight unit 3000 and the display panel 2000.

Alternatively, as shown in FIG. 11, when the display panel 2000 is an organic light emitting diode panel, the light path control member may be formed on the organic light emitting diode panel. That is, when the surface viewed by the user in the organic light emitting diode panel is defined as an upper portion of the organic light emitting diode panel, the light path control member may be disposed on the organic light emitting diode panel. The display panel 2000 may include a self-luminous element that does not require a separate light source. In the display panel 2000, a thin film transistor may be formed on the first base substrate 2100, and an organic light emitting element in contact with the thin film transistor may be formed. The organic light emitting element may include an anode, a cathode, and an organic light emitting layer formed between the anode and the cathode. In addition, the second base substrate 2200 configured to function as an encapsulation substrate for encapsulation may be further included on the organic light emitting element.

In addition, although not shown in drawings, a polarizing plate may be further disposed between the light path control member 1000 and the display panel 2000. The polarizing plate may be a linear polarizing plate or an external light reflection preventive polarizing plate. For example, when the display panel 2000 is a liquid crystal display panel, the polarizing plate may be a linear polarizing plate. Further, when the display panel 2000 is the organic light emitting diode panel, the polarizing plate may be an external light reflection inhibiting polarizing plate.

In addition, an additional functional layer 1300 such as an anti-reflection layer, an anti-glare, or the like may be further disposed on the light path control member 1000. Specifically, the functional layer 1300 may be adhered to one surface of the first substrate 110 of the light path control member. Although not shown in drawings, the functional layer 1300 may be adhered to the first substrate 110 of the light path control member via an adhesive layer. In addition, a release film for protecting the functional layer may be further disposed on the functional layer 1300.

Further, a touch panel may be further disposed between the display panel and the light path control member.

It is shown in the drawings that the light path control member is disposed at an upper portion of the display panel, but the embodiment is not limited thereto, and the light path control member may be disposed at various positions such as a position in which light is adjustable, that is, a lower portion of the display panel, or between a second substrate and a first substrate of the display panel, or the like.

In addition, it is shown in the drawings that the light conversion part of the light path control member according to the embodiment is in a direction parallel or perpendicular to an outer surface of the second substrate, but the light conversion part is formed to be inclined at a predetermined angle from the outer surface of the second substrate. Through this, a moiré phenomenon occurring between the display panel and the light path control member may be reduced.

Figure 12:
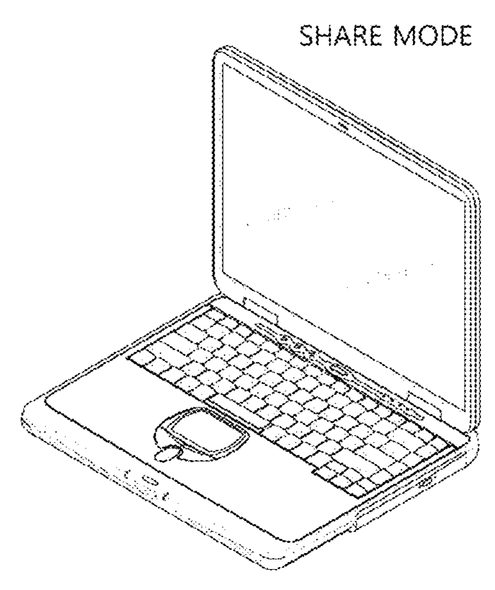
FIGS. 12 to 14 are views for explaining an embodiment of a display device to which an light path control member according to an embodiment is applied.
Figure 13:
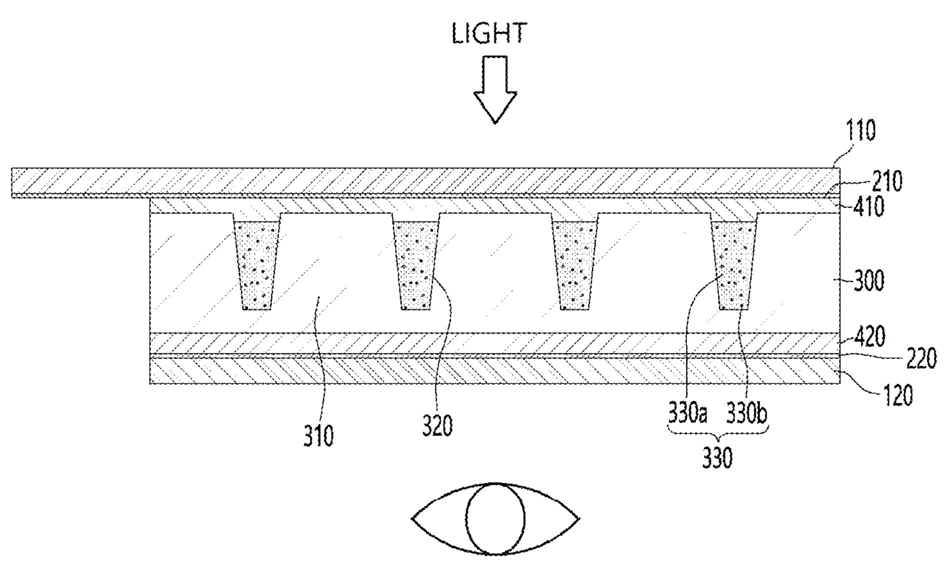
Figure 13:
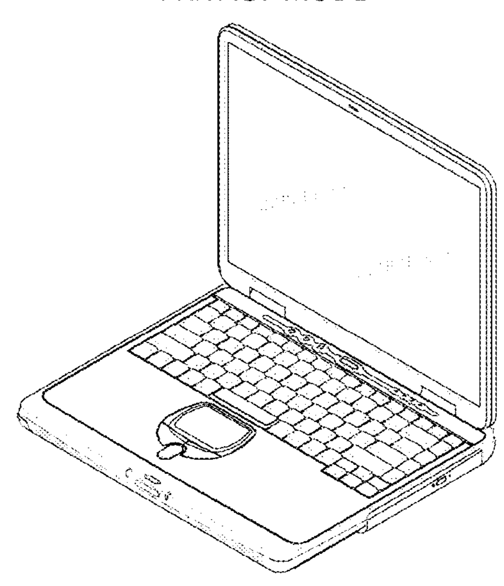
Figure 14:
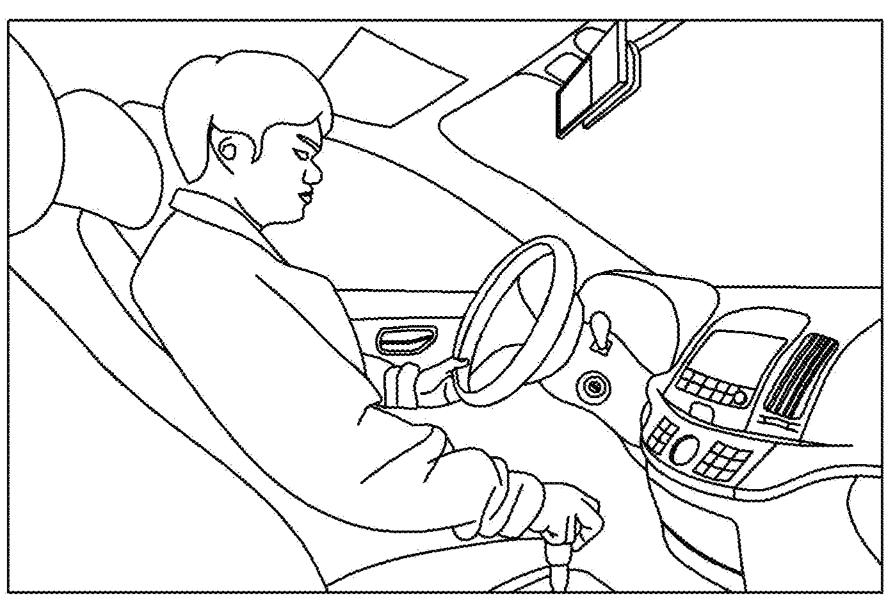

Referring to FIGS. 12 to 14, the light path control member according to the embodiment may be applied to a display device that displays a display.

Referring to FIGS. 12 to 14, the light path control member according to an embodiment may be applied to a display device that displays a display.

For example, when power is applied to the light path control member as shown in FIG. 12, the receiving part functions as the light transmitting part, so that the display device may be driven in the public mode, and when power is not applied to the light path control member as shown in FIG. 13, the receiving part functions as the light blocking part, so that the display device may be driven in the light blocking mode.

Accordingly, a user may easily drive the display device in a privacy mode or a normal mode according to application of power.

Light emitted from the backlight part or the self-luminous element may move from the first substrate toward the second substrate. Alternatively, the light emitted from the backlight part or the self-luminous element may also move from the second substrate toward the first substrate.

In addition, referring to FIG. 14, the display device to which the light path control member according to the embodiment is applied may also be applied inside a vehicle.

For example, the display device including the light path control member according to the embodiment may display a video confirming information of the vehicle and a movement route of the vehicle. The display device may be disposed between a driver seat and a passenger seat of the vehicle.

In addition, the light path control member according to the embodiment may be applied to a dashboard that displays a speed, an engine, an alarm signal, and the like of the vehicle.

Further, the light path control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

What is claimed is:

1. A light path control member comprising:

a first substrate;

a first electrode disposed on the first substrate;

a second substrate disposed on the first substrate;

a second electrode disposed under the second substrate;

a light conversion part disposed between the first electrode and the second electrode and including a plurality of receiving parts for receiving a light conversion material; and a sealing part sealing the light conversion material, wherein the sealing part includes:

a first sealing part and a second sealing part formed in a cutting region formed by cutting the second substrate, the second electrode, and the light conversion part and extending in a first direction; and a third sealing part and a fourth sealing part formed in a cutting region formed by cutting the second substrate, the second electrode, and the light conversion part and extending in a second direction different from the first direction, and wherein a thickness of at least one sealing part of the third sealing part or the fourth sealing part is different from a thickness of the first sealing part and the second sealing part.

2. The light path control member of claim 1, wherein a thickness of at least one sealing part of the third sealing part or the fourth sealing part is greater than that of the first sealing part and the second sealing part.

3. The light path control member of claim 1, wherein the first sealing part, the second sealing part, the third sealing part, and the fourth sealing part are disposed inside a cutting region formed by penetrating at least one of the first substrate, the first electrode, the light conversion part, the second substrate, or the second electrode.

4. The light path control member of claim 1, wherein widths of the third sealing part and the fourth sealing part are narrowed while extending from the second substrate toward the first substrate, and wherein a minimum width of at least one of the third or fourth sealing parts is 5% or less of a maximum width.

5. The light path control member of claim 1, wherein a number of receiving parts in contact with the first and second sealing parts is greater than a number of receiving parts in contact with the third and fourth sealing parts.

6. The light path control member of claim 1, wherein at least one of the third sealing part or the fourth sealing part is exposed and disposed on an outermost surface of the light path control member.

7. A light path control member comprising:

a first substrate;

a first electrode disposed on the first substrate;

a second substrate disposed on the first substrate;

a second electrode disposed under the second substrate;

a light conversion part disposed between the first electrode and the second electrode and including a plurality of receiving parts for receiving a light conversion material; and a sealing part sealing the light conversion material, wherein the sealing part includes a first sealing part and a second sealing part formed in a cutting region formed by cutting the second substrate, the second electrode, and the light conversion part and extending in a first direction; and a third sealing part and a fourth sealing part formed in a cutting region formed by cutting the second substrate, the second electrode, and the light conversion part and extending in a second direction different from the first direction, and wherein at least one of the third sealing part and the fourth sealing part is disposed inside a cutting region formed by penetrating the first substrate, the first electrode, the light conversion part, the second substrate, and the second electrode.

8. The light path control member of claim 7, wherein widths of the third sealing part and the fourth sealing part are narrowed while extending from the second substrate toward the first substrate, and wherein a minimum width of at least one of the third or fourth sealing parts is 5% or less of a maximum width.

9. The light path control member of claim 7, wherein at least one of the first sealing part or the second sealing part is disposed inside a cutting region formed by penetrating the first substrate, the first electrode, the light conversion part, the second substrate, and the second electrode.

10. The light path control member of claim 7, wherein a number of receiving parts in contact with the first and second sealing parts is greater than a number of receiving parts in contact with the third and fourth sealing parts.

11. The light path control member of claim 1, wherein the first sealing part and the second sealing part are arranged to be spaced apart from each other in the second direction, and wherein a length of the first sealing part in the first direction is different from a length of the second sealing part in the first direction.

12. The light path control member of claim 11, wherein the length of the first sealing part in the first direction is greater than the length of the second sealing part in the first direction.

13. The light path control member of claim 1, wherein the third sealing part and the fourth sealing part are arranged to be spaced apart from each other in the first direction, and wherein a length of the third sealing part in the second direction is different from a length of the fourth sealing part in the second direction.

14. The light path control member of claim 13, wherein the length of the third sealing part in the second direction is smaller than the length of the fourth sealing part in the second direction.

15. The light path control member of claim 1, wherein the first sealing part is disposed to be exposed on an outermost surface of the light path control member.

16. The light path control member of claim 1, wherein at least one of the first sealing part or the second sealing part includes a protruding region protruding toward an inside of the receiving part.

17. The light path control member of claim 1, wherein the light conversion part includes a partition wall part disposed between the plurality of receiving parts, and a base part disposed on the partition wall part and the plurality of receiving parts, and wherein a width of each receiving part increases with distance from the base part.

18. The light path control member of claim 7, wherein upper ends of the first sealing part, the second sealing part, the third sealing part, and the fourth sealing part overlap the second substrate along a horizontal direction.

19. The light path control member of claim 7, wherein upper ends of the first sealing part, the second sealing part, the third sealing part, and the fourth sealing part are located lower than an upper surface of the second substrate.

20. The light path control member of claim 7, wherein an outer surface of at least one of the first sealing part, the second sealing part, the third sealing part, or the fourth sealing part is exposed to an outside of the light path control member.

* * * * *